May 19, 1970 M. J. YACCINO 3,513,455
READOUT CIRCUIT ARRANGEMENT FOR A STORAGE SYSTEM
Original Filed March 18, 1964 2 Sheets-Sheet 1
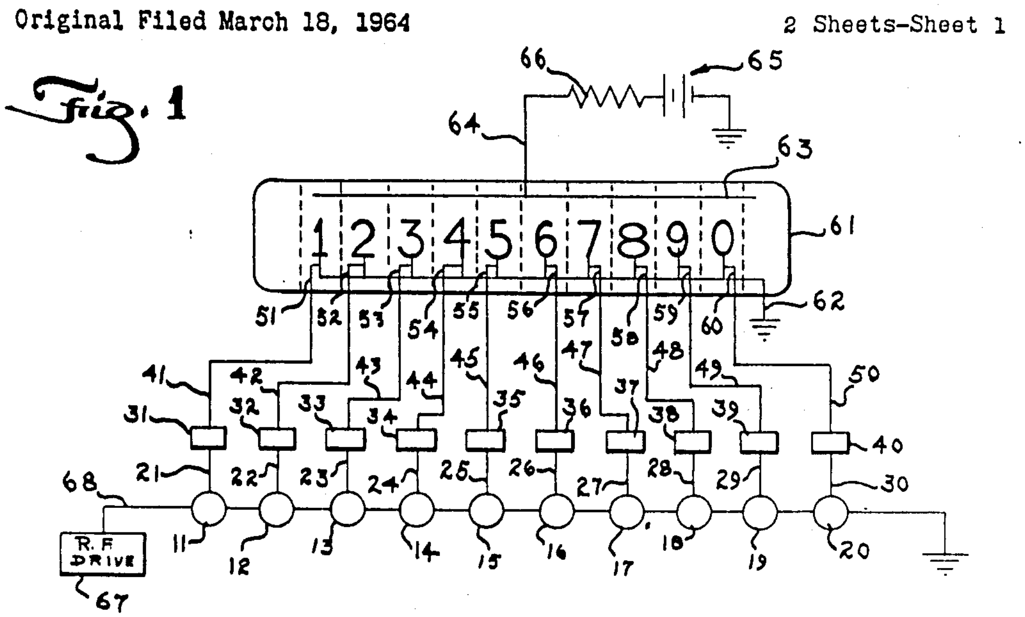
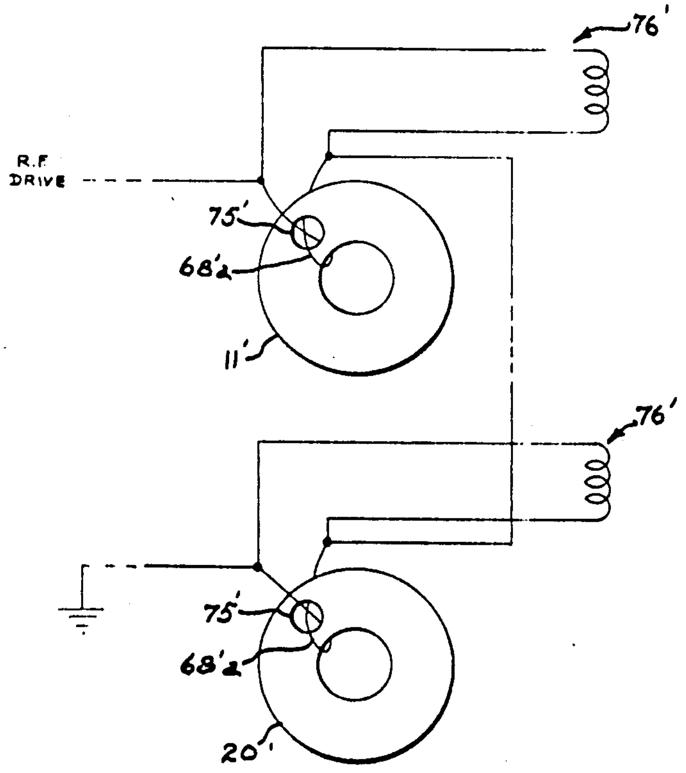
Fig. 3
INVENTOR.
MICHAEL JOSEPH YACCINO
BY [signature]

READOUT CIRCUIT ARRANGEMENT FOR A STORAGE SYSTEM

Original Filed March 18, 1964 2 Sheets-Sheet 2

INVENTOR.
MICHAEL JOSEPH YACCINO
BY Curtis, Morris & Safford

United States Patent Office 3,513,455

Patented May 19, 1970

3,513,455
READOUT CIRCUIT ARRANGEMENT FOR A STORAGE SYSTEM

Michael Joseph Yaccino, Mechanicsburg, Pa., assignor to AMP Incorporated, Harrisburg, Pa.

Continuation of application Ser. No. 352,898, Mar. 18, 1964. This application June 27, 1968, Ser. No. 744,613

Int. Cl. G11c *11/08*

U.S. Cl. 340—174 7 Claims

ABSTRACT OF THE DISCLOSURE

A readout circuit arrangement for magnetic core means contains a control circuit means connected to readout means coupled onto magnetic core means with the readout means being actuated by drive circuit means coupled to the magnetic core means for providing readout of information present in the magnetic core means on the readout means thereby actuating the control circuit means which in turn actuates utilization circuit means connected to the control circuit means.

This application is a continuation of Ser. No. 352,898, filed Mar. 18, 1964, now abandoned.

This invention relates to a readout circuit arrangement for a storage system having magnetic core means.

It is known to use an RF drive coupled to magnetic core means to actuate readout winding means also coupled thereto. This readout winding means is generally connected to incandescent light means in order to give an indication whenever information is stored within the storage system. While incandescent light means have proved satisfactory, there are certain drawbacks connected therewith. Some of these drawbacks are: an incandescent light means has to be connected to each magnetic core means, an individual mounting means is needed for each incandescent light means, the life expectancy of the incandescent light means is not too long, and numbered rows of lights are necessary.

It is, therefore, a primary object of the present invention to provide a readout circuit arrangement which overcomes the above-mentioned drawbacks.

Another object of the present invention is to provide a readout circuit arrangement compatible with the magnetics life.

A further object of the present invention is that it is usable with existing magnetic storage systems.

An additional object of the present invention is that it is simple and inexpensive while providing excellent operability in the form of non-destructive, interference-free readout of information from magnetic core means.

In U.S. Pat. 2,995,731, there is disclosed a core array comprising a number of multi-aperture magnetic cores (MAD's) and connecting wire only. The cores are divided into even and odd groups and connected in sequence, a core of one group being able to transmit a binary one or zero to the next core in the other group, and so on. To shift the binary information, which is stored in the form of magnetic flux, in one core to the next, the groups of cores are energized by drive currents applied in proper sequence to an advance odd to even (ADV O to E) winding, an advance even to odd (ADV E to O) winding, and a prime winding.

It is advantageous because of cost, size and circuit efficiency to use rather small MAD cores in a core array, such as described above. Typically, these cores are about the size of a shirt button. Now, because of the small size of the cores, their power handling capacity is quite limited. Generally speaking, with cores of this small size, it is impossible to obtain sufficient output current to actuate an information utilization device directly from a core using previously known readout techniques. This is made even more difficult where a number of information utilization devices are used, as for example, in multi-core shift registers or storage means. Here some, none or all of the information utilization devices may be actuated depending upon the respective information status of the cores in the registers or storage means. Thus, a widely varying load is placed on the power supply for the information utilization devices. Previously, even though a given supply circuit had been able to actuate one or a few information utilization devices, there was undesirable variation in the information utilization devices, as more and more were turned on or off. Thus, as a practical matter, such an information utilization arrangement, such as a visual display arrangement has not heretofore been satisfactory.

In U.S. patent application, Ser. No. 249,465, filed Jan. 4, 1963, there is disclosed a shift register wherein each odd core of a multi-core MAD shift register is provided with a respective coupling to an information utilization device which is actuated and deactuated in accordance with whether the core is set with a one or a zero. Each information utilization device, when actuated, is provided with a substantially constant output regardless of how many or how few information utilization devices are actuated at a particular instant. A unique power supply or drive circuit for the information utilization devices provides continuous, non-destructive readout from a minor aperture of each core, and this is achieved without interfering with normal operation of the shift register. The power supply is designed to provide essentially constant current to a drive winding linking all of the minor readout apertures of the cores, the frequency, amplitude and waveform of this current being particularly chosen so that in relation to the size and material of the cores, they are most efficient in driving the respective information utilization devices coupled to them as well as providing normal operation of the circuit, as a shift register or storage means, without any affect thereon.

In accordance with the present invention in one specific embodiment thereof, some or all magnetic core means of a multi-core MAD storage means are provided with a respective coupling which is connected to an information utilization means. A power supply is also coupled to these core means to actuate the core means to provide a non-destructive and continuous readout to the information utilization means in order to utilize the information therein.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration and principles thereof and the manner of applying it in practical use so that they may modify it in various forms, each as may be best suited to the conditions of a particular use.

FIG. 1 is a diagrammatic representation of the invention;

FIG. 3 shows an embodiment of FIG. 2.

Figure 2:
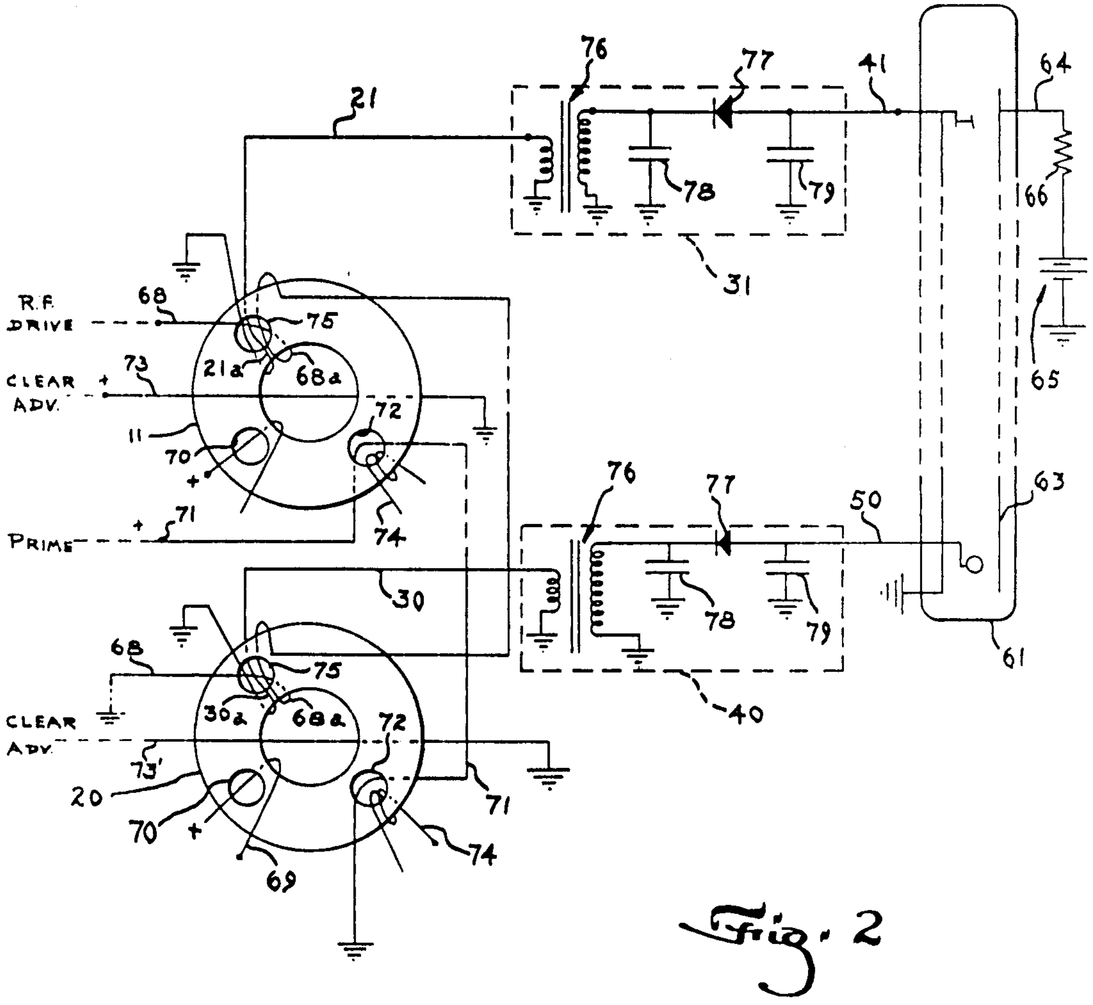
FIG. 2 is a schematic diagram of MAD cores wherein a readout winding is coupled to each core and is connected to a utilization device.

FIG. 1 illustrates a decade of multi-aperture core devices 11 . . . 20 which have readout leads 21 . . . 30 connected, respectively, to control circuits 31 . . . 40. Leads 41 . . . 50 connect each control circuit, respectively, to cathodes 51 . . . 60 of an indicator tube 61, such as disclosed in U.S. Pat. No. 2,268,441.

Cathodes 51 . . . 60 are connected in common to lead 62 and anode 63 is connected to lead 64. Leads 62 and 64 are, respectively, connected to the negative and positive sides of a suitable source of supply 65, such as, 95–110 volts at 1 ma. A resistor 66 is contained in lead 64.

An RF drive circuit 67, similar to that disclosed in the above-mentioned patent application, is coupled to each core 11 . . . 20 by lead 68 which is connected to ground. The other conventional circuitry for magnetic core systems such as, clear, set, input, etc., have been omitted from FIG. 1 for purposes of clarity but are schematically illustrated in FIG. 2.

The magnetic core circuits shown in FIG. 2 include MAD cores 11 and 20 representative of the first and last cores in the decade of FIG. 1. Information, either in a binary one or a binary zero, is fed into each core by means of input windings 69 threading minor input apertures 70 of the cores. When the cores are saturated with flux in the clockwise direction, they are said to be set with a zero; when the cores are saturated partly in the clockwise direction and partly in the counterclockwise direction, they are said to be set with a one. Thereafter, by application of suitable currents in the proper sequences to prime windings 71 threading minor output apertures 72 and to clear advance windings 73 and 73' threading the major apertures of the cores, information stored in the cores is transferred therefrom on output windings 74 threading apertures 72. Windings 73 and 73' are, respectively, threaded through odd and even cores if the core array is to be used, as for example, as a shift register or either winding can be serially threaded through all the cores if the core array is to be used, as for example, as a counter. Now, each core 10 . . . 20 is provided with a minor readout aperture 75, which, as can be discerned, is threaded in "Figure-8" fashion by drive winding **68*a* and by readout windings 21*a* . . . 30*a*. One end of winding 21*a* is connected to the primary winding of transformer 76 via lead 21 in circuit 31** while the other end of each is connected to ground.

The secondary of transformer 76 has one end connected to ground while the other end is connected to the cathode containing number 1 via lead 41 which contains diode 77 therein. Capacitors 78 and 79 are connected between lead 41 and ground on each side of diode 77. Each of control circuits 31 . . . 40 have the same components and are, respectively, connected to the cathode of indicator means 61 corresponding to the character to be displayed when the core means connected thereto is rendered set.

There is applied continuously to drive windings **68*a* a steady, sinusoidal current from RF drive unit 67 through lead 68. The current from the unit has a frequency sufficiently high so that the magnetic material of the cores, when they are in a locally switchable state about apertures 75, will complete switching as the current through windings 68*a* begin to reverse. A suitable frequency is, for example, about 375 kilocycles. This provides higher efficiency in driving the information utilization means than would an appreciably lower frequency. It is also desirable to use a sine waveform, rather than a square wave, for example, since flux switching about apertures 75** will take place smoothly over each cycle.

When core 11, for example, is set with a binary one, there will be for reasons known to the art, a flux locally switchable around a minor aperture of the core. In this event, the high frequency current flowing in drive winding **68*a* causes switching of the flux locally around minor aperture 75 but not around the major aperture nor around any other minor aperture of the core. This local switching of flux will induce a current in load winding 21*a* which is applied across the primary of transformer 76 whose secondary is made to resonate at the applied RF by means to capacitor 78 in shunt therewith. Thus, the primary to secondary voltage gain is a function of the Q of the transformer and the step-up turns ratio thereof. Since the frequency at which the readout is effected is high, transformer 76 is of the ferrite core type in order to minimize eddy and hysteresis losses. This stepped-up voltage is half-wave rectified and filtered by means of diode 77 and capacitor 79 and then applied to the cathode containing the reference character as a negative voltage with respect to ground while a positive voltage is continuously applied to the anode of the indicator tube via source 65** causing the voltage between the anode and cathode to exceed actuating voltage, to thereby display the reference character.

When the core is clear or set with a zero, the voltage difference between the anode and selected cathode is insufficient to actuate the indicator tube. When the core is cleared, the negative voltage falls below actuation voltage of the display means causing the reference character to extinguish.

It is obvious that the scheme as described and illustrated does not interfere with any type of transfer of information, be it serial-serial, serial-parallel, parallel-parallel or parallel-serial, such as desired, and a more detailed explanation of these transfers of information will be found in U.S. patent application, Ser. No. 200,983, filed June 8, 1962, now Pat. No. 3,215,994. It is also obvious that the present scheme also may be used in conjunction with the continuous selective readout circuit arrangement for magnetic core systems disclosed in detail in U.S. patent application, Ser. No. 331,761, filed Dec. 19, 1963, now Pat. No. 3,426,334.

When the present invention is used in connection with a plurality of information utilization circuit means, the evenness of current through a respective information utilization circuit means, when on, is essentially independent of how many or how few information utilization circuit means are actuated at a given instant. This is accomplished by maintaining the current in lead 68, which is common to all drive windings coupled to the readout apertures in any array of cores, effectively constant regardless of the size of the load coupled to the winding. In this connection, source 65 would be common to all information utilization circuit means. In the case of, for example, a forty bit register, this load can vary by over ten-to-one. To accommodate this variation, RF drive 67 is made to operate at a constant current source as outlined above in Ser. No. 249,465. Thus, continuous readout from the cores is obtained throughout a core array without adverse interaction of the RF drive and readout windings upon utilization of the information therein.

It is possible in the present circuit to use a different arrangement, for example, a single turn of wire through aperture 75 for each of windings **21*a* . . . 30*a* and a single turn for each of windings 68*a*. However, in this case, the circuit will operate less efficiently and there will be some effect on the operation of the core array. The winding arrangement for these windings may be provided with additional turns as illustrated in FIG. 3 of above-mentioned Ser. No. 331,761 so that drive current on windings 21*a* . . . 30*a* is about half enough to switch flux around the major apertures of the cores. With a core made of General Ceramics type 5209 ferrite material, having a thickness of 0.060 inch, a major aperture diameter of 0.240 inch and an outside diameter of 0.36 inch, 300 ma. peak-to-peak of sine wave current at about 375 kc. on windings 21*a* . . . 30*a*** is suitable for providing sufficient current to actuate desirable information utilization circuit means.

Instead of employing readout windings **21*a* . . . 30*a*, the primary windings of transformers 76' may be connected to respective legs of windings 68'*a* as illustrated in FIG. 3. This scheme operates just as effectively as that disclosed in FIG. 2 and eliminates having to thread readout windings 21*a* . . . 30*a* in readout apertures 75' of cores 11' . . . 20'** which can amount to considerable savings with regard to labor.

The present system has several advantages over other ways of indicating the state of a core or array of cores some of which are: the life of the indicator tube means is more compatible with that of the magnetics; system is completely passive; better from a human engineering standpoint since individual characters are shown rather than a row of lights and space requirements are lessened; this scheme would prove cheaper when considering maintenance and incandescent lamp replacement costs; the positive source of supply for the anode voltage requires only about 3 ma./decade capability with a ±3% voltage variation; the system does not require readout "Figure-8" windings yet is compatible with most existing core arrays with RF readout; the system is very insensitive to variations to RF peak-to-peak current amplitude and ±20% variations can be tolerated and when using the back voltage developed across the RF readout terminals, this presents an easier load to drive from the RF drive circuit.

As can be discerned, there has been disclosed a unique readout circuit arrangement to be utilized with core means.

It will, therefore, be appreciated that the aforementioned and other desirable objects have been achieved; however, it should be emphasized that the particular embodiment of the invention, which is shown and described herein, is intended as merely illustrative and not as restrictive of the invention.

What is claimed is:

1. A readout circuit arrangement including magnetic core means having on and off information states, readout means coupled on said magnetic core means, drive circuit means coupled to said readout means on said magnetic core means for providing continuous readout of information states present therein on said readout means, control circuit means connected to said readout means to be actuated thereby responsive to on information states occurring therein, said circuit control means including means to block actuation responsive to off information states occurring therein, and utilization circuit means directly connected to said control circuit means and operated thereby, wherein said readout means includes a minor aperture in said magnetic core means having winding means threaded therethrough in "Figure-8" fashion.

2. A readout circuit arrangement according to claim 1 wherein said winding means includes first and second winding means threaded through said minor aperture in in "Figure-8" fashion, said first winding means being serially connected to said drive circuit means while said second winding means is serially connected to said control circuit means.

3. A readout circuit arrangement according to claim 1 said winding means being serially connected to said drive circuit means and connected in shunt with said control circuit means.

4. A readout circuit arrangement according to claim 1 wherein said utilization circuit means includes display tube means having character cathode means connected to said control circuit means and anode means connected to a substantially constant positive voltage source.

5. A readout circuit arrangement including magnetic core means having on and off information states, readout means coupled on said magnetic core means, drive circuit means coupled to said readout means on said magnetic core means for providing continuous readout of information states present therein on said readout means, control circuit means connected to said readout means to be actuated thereby responsive to on information states occurring therein, said circuit control means including means to block actuation responsive to off information states occuring therein, and utilization circuit means directly connected to said control circuit means and operated thereby, wherein said control circuit means includes transformer means having the primary winding thereof coupled to said readout means, rectifier and filter means connected to the secondary winding of said transformer means which, in turn, are connected to said utilization circuit means.

6. A readout circuit arrangement according to claim 5 wherein said drive circuit means has a frequency of about 375 kc., the secondary winding of said transformer means has capacitance means connected in shunt therewith to cause the secondary winding to resonate at said frequency.

7. In a magnetic memory array comprising a plurality of magnetic core means each having on and off information states and a minor readout aperture, readout means coupled to each minor readout aperture, drive circuit means serially coupled to each minor readout aperture to provide continuous and substantially constant drive current thereto to actuate said readout means upon information states being present in said magnetic core means, control circuit means connected to said readout means and utilization means having anode and cathode terminals connected to said control means, said control means including responsive to an on information state at said readout means for varying the voltage on one of said terminals in a first polarity direction and responsive to an off information state at said readout means for varying the voltage on said one of said terminals in a polarity direction opposite to said first polarity direction.

References Cited

UNITED STATES PATENTS

| | | | |
|---|---|---|---|
| 3,331,965 | 7/1967 | Andreasen | 307—88 |
| 3,343,146 | 9/1967 | Walker | 340—174 |
| 3,362,020 | 1/1968 | Reiner | 340—174 |
| 3,378,689 | 4/1968 | Trabold | 307—88 |

STANLEY M. URYNOWICZ, Jr., Primary Examiner